United States Patent [19]

Kelly et al.

[11] Patent Number: 4,913,129

[45] Date of Patent: Apr. 3, 1990

[54] SOLAR RECEIVER HAVING WIND LOSS PROTECTION

[75] Inventors: Bruce D. Kelly, Napa; Robert L. Lessley, Sonoma, both of Calif.

[73] Assignee: Bechtel Group, Inc., San Francisco, Calif.

[21] Appl. No.: 355,717

[22] Filed: May 22, 1989

[51] Int. Cl.[4] .............................................. F24J 2/02
[52] U.S. Cl. .................................... 126/451; 126/435; 126/449; 126/450
[58] Field of Search ............... 126/451, 450, 438, 424, 126/425, 449, 435, 417, 419, 418, 422; 60/641.15; 165/8, 10; 98/36; 297/188, 229

[56] References Cited

U.S. PATENT DOCUMENTS

| | | | |
|---|---|---|---|
| 3,875,925 | 4/1975 | Johnston | 126/449 |
| 4,063,701 | 12/1977 | Wray | 297/188 |
| 4,312,324 | 1/1982 | Ross et al. | 126/418 |
| 4,394,859 | 7/1983 | Drost | 126/451 |
| 4,633,854 | 1/1987 | Mayrhofer | 126/451 |
| 4,676,068 | 6/1987 | Funk | 126/438 |
| 4,683,872 | 8/1987 | Fricker | 126/449 |
| 4,777,934 | 10/1988 | De Laquil | 126/435 |
| 4,777,935 | 10/1988 | Fricker | 126/449 |

OTHER PUBLICATIONS

"An Investigation Of Aerowindows For Solar Receivers", Final Report-Contract No. DE-AC0-3-83SF11693, May 1984.

"An Investigation Into The Feasibility Of An Air Curtain For A Solar Central Receiver", Final Report-Contract No. DE-AC03-83SF11940, Jun. 1984.

Primary Examiner—James C. Yeung
Attorney, Agent, or Firm—Townsend and Townsend

[57] ABSTRACT

A central solar receiving tower includes an air permeable heating surface which is exposed directly to the ambient. The heating surface receives solar radiation from a heliostat field and a warm airstream is circulated to the forward exposed face of the heating surface. As the warm airstream passes through the heating surface, its temperature is further raised and energy can be extracted from the air prior to being returned to the heating surface. The warm air introduced to the exposed face of the heating surface is directed in a generally converging pattern and flows through the heating surface with a generally uniform flow profile. A protective airstream is provided adjacent the warm air return airstream in a similar converging pattern. By properly controlling the relative flow rates, a flow boundary between the warm air and the protective air can be maintained, with the warm air flowing inward through the heating surface and the cold air flowing outward to buffer the warm air from ambient conditions.

22 Claims, 4 Drawing Sheets

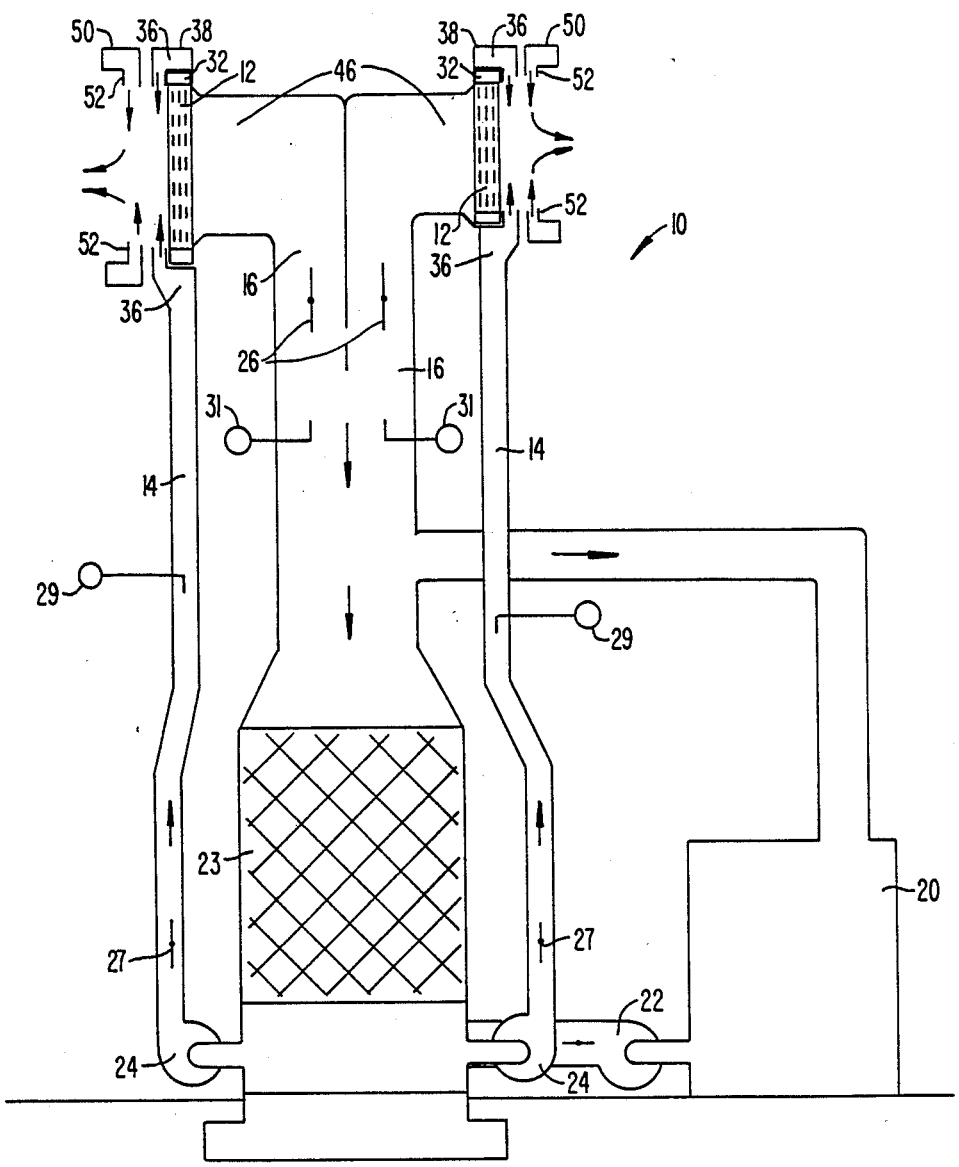
FIG._1.

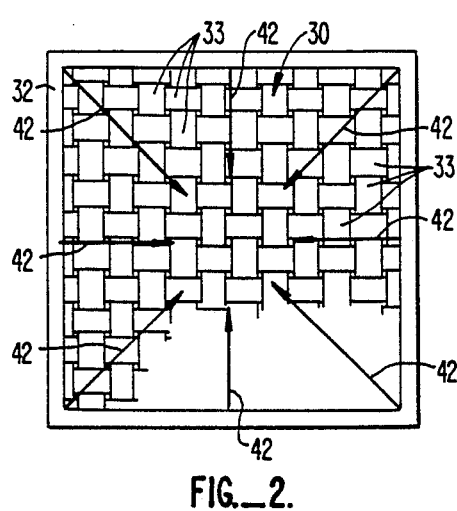
FIG._2.
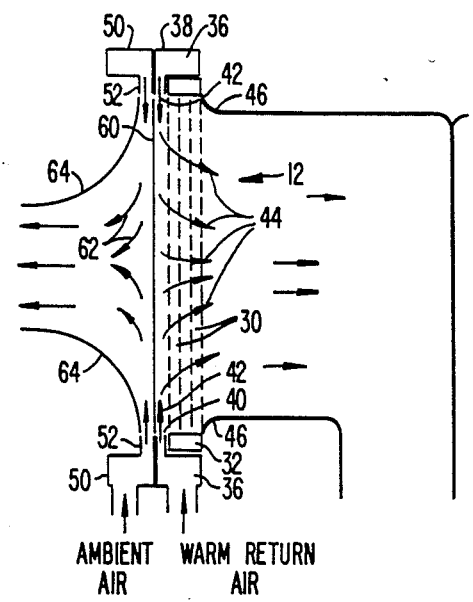
AMBIENT AIR  WARM RETURN AIR
FIG._3.
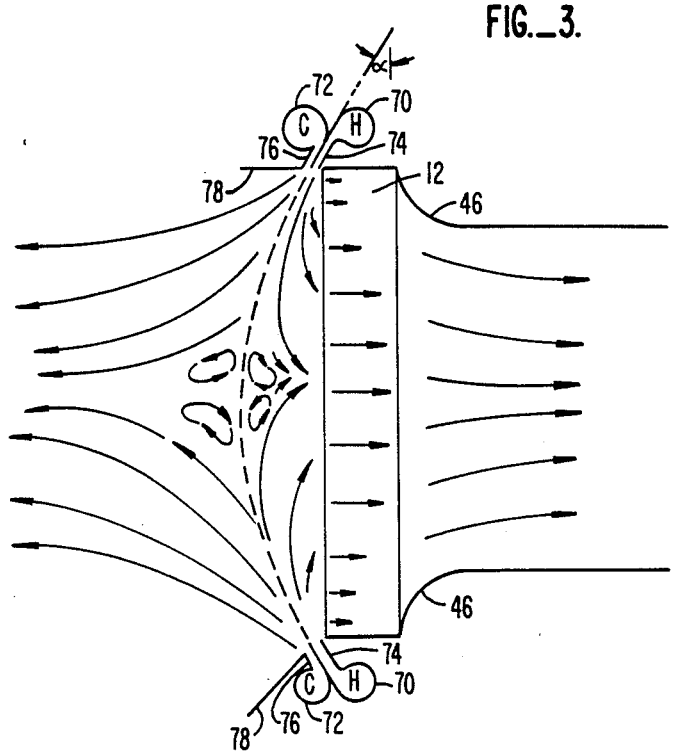
FIG._4.

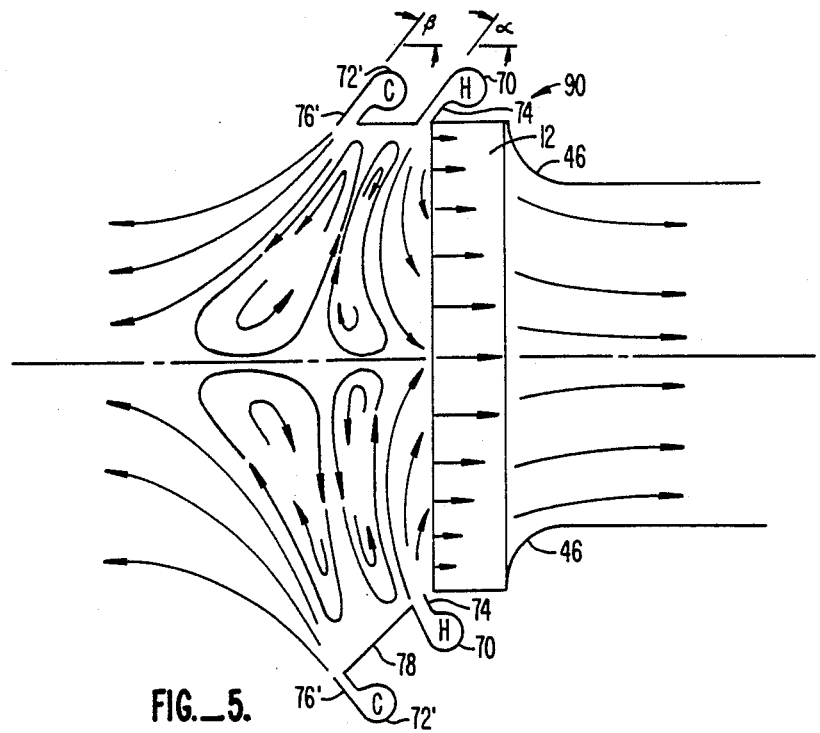
FIG._5.
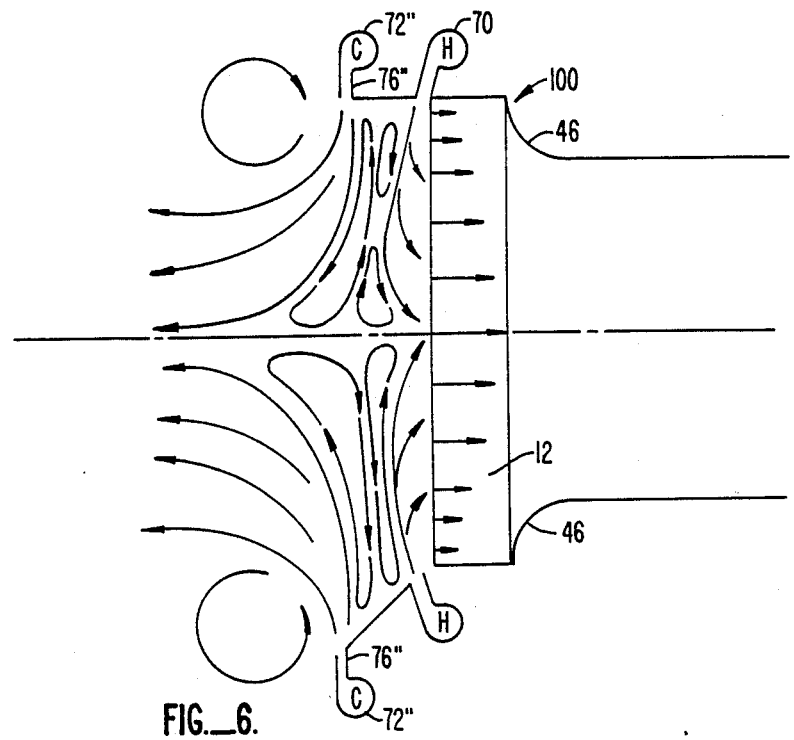
FIG._6.

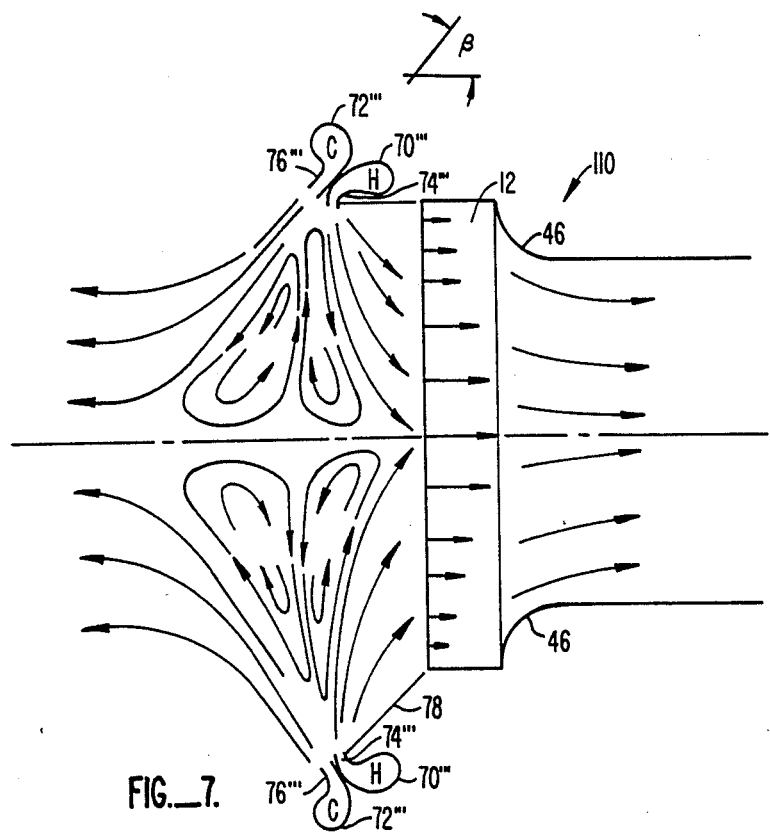
FIG._7.
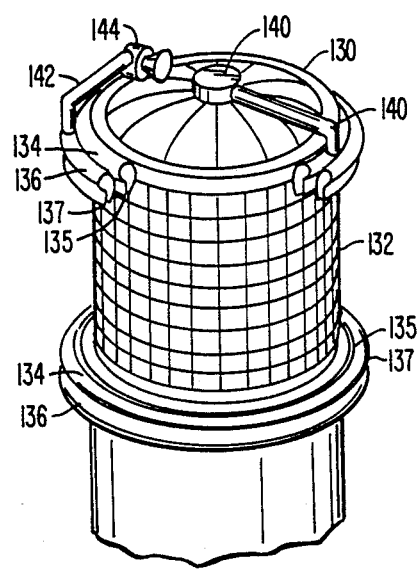
FIG._8.

SOLAR RECEIVER HAVING WIND LOSS PROTECTION

BACKGROUND OF THE INVENTION

1. Field of the Invention

The present invention relates generally to solar receivers capable of heating a recirculating airstream, and more particularly to methods and systems for inhibiting ambient heat losses in such receivers resulting from wind interference and the like.

Central solar receivers produce energy directly from the sun and promise to provide stationary power sources which are substantially free from all forms of pollution. While a number of specific designs have been proposed for constructing central solar receivers, they generally rely on placing an elevated receiver assembly at a focus point located in a large field of heliostats (mirrors). The heliostats reflect incident sunlight onto the receiver where a heat exchange unit is provided to raise the temperature of a circulating heat exchange medium. Heat may then be extracted from the heat exchange medium and used, for example, to generate steam which can then be used for conventional electrical generation.

Of particular interest to the present invention, it has been proposed to use central solar receivers which employ an air permeable heat exchange unit which is capable of raising the temperature of a circulating airstream which passes through the unit and acts as the heat exchange medium. To enhance efficiency and reduce capital costs, the heat exchange member is exposed directly to the ambient with the recirculating airstream being introduced through the exposed side and being collected on an enclosed side of the receiver. As might be expected, however, ambient winds can interfere greatly with the flow of air into the heat exchange element and provisions must be made to reduce such interference.

To overcome such wind losses, it has been proposed to recess the heat exchange element well inside an enclosure and to direct an open aperture in the enclosure downward so that the warm air tends to remain entrapped inside the enclosure, thus reducing mixing and ambient losses. Such an approach is illustrated in U.S. Pat. No. 4,312,324. While generally workable, the approach suffers from certain drawbacks. The necessity of orienting the aperture downward requires construction of a taller and more expensive tower, or alternatively, limits area over which the heliostat field may be constructed which in turn limits the amount of solar energy that can be delivered to the receiver. Moreover, the need to recess the heat exchange element increases the capital cost of constructing the solar receiver as it requires substantial additional structure.

U.S. Pat. No. 4,312,324, further teaches the provision of a concentrator and passive deflector circumscribing the open aperture in the solar receiver enclosure. The patent also teaches that active wind deflection may be provided by the use of a plurality of air nozzles projecting substantially away from the open aperture. While these approaches may provide limited protection from ambient winds, they both rely on the receiving element being recessed well within the receiving enclosure. Moreover, they rely on the aperture being sized to have a cross-sectional area much less than that of the heat exchange element. Neither would be useful in constructions where the heat exchange element is exposed directly to the ambient and not recessed behind a reduced-diameter aperture.

For these reasons, it would be desirable to provide solar receivers having heat exchange elements which are directly exposed to the ambient and which do not need to be recessed or inclined downward in order to inhibit heat losses. In particular, it would be desirable to provide systems and methods for protecting such solar receivers from heat losses resulting from ambient winds.

2. Description of the Background Art

U.S. Pat. No. 4,312,324 is discussed hereinabove. U.S. Pat. No. 4,777,934 describes a windowless solar receiver which employs a recirculating particulate-laden airstream for absorbing reflected solar radiation. An air curtain flowing generally parallel to the particulate-laden airstream protects the particulate-laden airstream from ambient disturbances. Central solar receivers intended for heating air on a once-through basis are generally described in U.S. Pat. Nos. 4,777,935; 4,676,068; 4,683,872; and 4,394,859. U.S. Pat. No. 3,875,925, describes a porous barrier which is heated by the sun and transfers thermal energy to air passing therethrough. The use of air curtains to protect windowless solar receivers is discussed generally in Final Reports prepared under Department of Energy Contract No. DE-AC03-83SF11693 and No. DE-AC03-83SF11940.

SUMMARY OF THE INVENTION

According to the present invention, a novel system and method for introducing a recirculating airstream to an air permeable heating surface is provided. The air permeable heating surface is typically a solar heating element or structure which is part of a central solar receiver which is exposed to the ambient to collect solar radiation reflected from a field of heliostats. The air permeable heating surface will usually be exposed directly to the ambient and will not be recessed within a protective enclosure and/or maintained behind an aperture having an area less than that of the heating surface The present invention provides a protective airstream or curtain which is able to effectively inhibit heat losses resulting from mixing and spilling of the recirculating air as it is introduced to the exposed side of the heating surface. By not relying on an enclosed volume within a protective enclosure, it is not necessary to incline the heating surface downward as previously required. Heating surfaces which are maintained in a vertical or substantially vertical orientation are able to receive solar radiation reflected over a much larger area than otherwise or, alternatively, operate efficiently with a shorter and less expensive tower. Moreover, elimination of the protective enclosure for the heating surface substantially reduces the capital costs associated with the construction of the system of the present invention.

The present invention functions by recirculating the airstream along a path past the air permeable heating surface so that the air is heated as it passes through the surface structure. The present invention relies on flowing the airstream in a converging pattern adjacent to the exposed side of the air permeable heating surface. Usually, the airstream will be directed in a generally radially converging pattern with the air being drawn through a substantially flat or planar air heating surface in a generally uniform flow profile. Alternatively, the airstream to be heated can be directed to converge along a generally straight or curved front with the resulting flow profile through the heating surface again being substantially uniform. The latter configuration is particularly useful with arcuate or cylindrical surfaces where radial convergence is not possible.

Protection of the airstream to be heated is provided by a protective (second) airstream or curtain which is formed on the side of the heated airstream opposite to that of the heated surface. The protective airstream is typically unheated ambient air and is formed to have a flow pattern substantially similar to that of the heated airstream. The outward flow of the protective airstream acts as a buffer in protecting the heated airstream from ambient disturbances. Under some conditions, it may be desirable that the flow velocities of the adjacent portions of the two airstreams be equalized. Under other conditions, such as high ambient wind conditions, it will be desirable that the flow velocity profile of the protective airstream be substantially greater than that of the heated airstream. Thus, the ratio of protective air velocity to heated air velocity may vary from about 1:1 (equal velocities) to 10:1, with higher ratios generally employed under higher wind velocities.

BRIEF DESCRIPTION OF THE DRAWINGS

FIG. 1 is a schematic illustration of a central solar receiving tower constructed in accordance with the principles of the present invention.

FIG. 2 illustrates an air permeable heating surface comprising a multilayer wire mesh which is useful in the central solar receiving tower of FIG. 1.

FIG. 3 is a schematic illustration of the air flow profiles of both the heated airstream and the protective airstream in the embodiment of FIG. 1.

FIGS. 4–7 illustrate alternative embodiments of the air permeable heating surface of the present invention in combination with systems for introducing the heated airstream and protective airstream. These figures further illustrate the utilization of a reflecting skirt about the heated air surface in order to increase solar collection efficiency.

FIG. 8 illustrates an embodiment of the present invention which utilizes a cylindrical air permeable heating surface, including the associated systems for introducing heated and protective airstreams thereto.

DESCRIPTION OF THE SPECIFIC EMBODIMENTS

Referring now to FIG. 1, a central solar receiving tower 10 constructed in accordance with the principles of the present invention comprises a plurality of air permeable heating surfaces 12, a warm air riser 14 connected to provide air to be heated to each heating surface, and a downcomer conduit 16 connected to take away heated air from each heating surface. The tower 10 will further comprise supporting structure (not illustrated) in order to provide the necessary mechanical framework for all the systems of the tower. A sufficient number of heating surfaces 12 will be provided to receive reflected solar radiation from the entirety of the heliostat field (not illustrated). Although only one flat heating surface is necessary, depending on the plant size there will usually be at least two air permeable heating surfaces 12 disposed in different directions so that each is able to receive radiation from a portion of the field. Typically, there will be four heating surfaces 12 for receiving reflected radiation from individual quadrants of the heliostat field, and in some cases, it may be desirable to provide even greater numbers of the individual heating surfaces. As will be described further in connection with FIG. 8 hereinafter, it is also possible to form the heating surface(s) in an arcuate or cylindrical geometry which allows efficient solar collection from heliostats located in all directions about the central solar receiving tower.

Generally, the heated airstreams will flow along a path defined by the risers 14 and the downcomers 16 and will be directed to an apparatus located along the path, which is capable of extracting the thermal energy from the air and producing useful work therefrom. As illustrated, a steam generator plant 20 may be provided, where the airstream from which the heat has been extracted is returned to the tower 10 by a fan 22.

Frequently, it will be desirable to provide a thermal storage device 23, typically a thermal mass (which is heated by the recirculating heated airstream) in the air circulation loop defined by the downcomers 16 and risers 14. The thermal storage device 23 will minimize disruptions resulting from variations in the amount of solar radiation received by the air permeable heating surfaces 12. In particular, when the amount of solar radiation is reduced, the thermal storage device 23 can return heat to the flowing airstream so that the steam generator 20 may continue in operation, even if the sun is totally blocked for brief periods of time. In contrast, when the air permeable heating surfaces 12 are receiving large amounts of solar radiation, heat will be transferred to the thermal storage device 23 where it will remain available for future use.

Blowers 24 will be provided to return the air from which heat has been extracted to the air permeable heating surfaces 12 where it will be reheated to a desired operating temperature. Typically, the air will be heated to a temperature in the range from about 1000° F. to 1600° F., typically being in the range from about 1250° F. to 1350° F., where the air being returned to the heating surfaces 12 through the risers 14 will have a temperature in the range from about 200° F. to 600° F., typically in the range from about 400° F. to 550° F. Thus, the air being returned to the heating surfaces 12 will remain heated relative to ambient conditions but will require a further increase in temperature before being recirculated through the steam generator 20 or thermal storage device 23. The temperature of the heating surfaces 12 will typically be in the range from about 1100° F. to 1700° F., more typically being in the range from 1300° F. to 1500° F.

Flow dampers 26 will be provided in each downcomer 16 in order to control the air temperature exiting the heating surfaces 12, with the mass flow being decreased to raise the temperature and increased to lower the temperature. Air dampers 27 are provided in the risers 14 in order to balance the upward mass flow through riser 14 with the corresponding downward mass flow through the downcomer 16. Alternatively and/or additionally, these two flow rates may be balanced by modulating the drive motor speeds of the respective fans 24. Conveniently, mass flow meters 29 and 31 are provided in the riser 14 and downcomer 16, respectively, to facilitate control. Temperature systems (not illustrated) will also be provided, and system control accomplished using conventional analog and/or digital control equipment (not illustrated).

Ambient wind causes an imbalance in the static pressure experienced by each of the heating surfaces 12, with the surfaces facing into the wind experiencing an increase in pressure and those facing downstream experiencing a decrease in pressure Such differential pressure will unbalance the volumetric flow passing from the air permeable heating surface 12 into the associated downcomer 16. This can lead to either dumping of excess warm air to the ambient (typically from a downwind heating surface) or to the introduction of cold ambient air into the downcomer 16 (typically to an upwind heating surface). Such losses due to mismatch of the volumetric flow of air passing upward through individual risers versus that flowing downward through the individual downcomer 16 can be compensated for by properly adjusting the dampers 27 and/or the drive motor speeds for the fans 24.

Suitable air permeable heating surfaces 12 will comprise structures which are capable of absorbing large amounts of solar radiation and converting such radiation to thermal energy. Such heating surfaces will also be sufficiently permeable to provide for relatively large mass flow rates of air therethrough. As the air passes through the heated surface, it will become heated by heat transfer from the surface.

Referring now to FIGS. 1–3, a suitable flat air permeable heating surface 12 may be formed as a series of grid structures 30, each consisting of interwoven horizontal and vertical courses of wire screen strips or ribbons 33. Each strip 33 is tensioned on a frame 32, typically having a square or rectangular geometry. A sufficient number of grid structures 30 is provided to absorb reflected energy from the heliostat field and heat the air passing therethrough. The individual screen strips 33 typically have a width in the range from 2 feet to 10 feet. The overall height and width of the grid structures 30 will typically be from 30 feet to 90 feet. The interwoven strip configuration is ideal for such large dimensions. The individual screen strips 33 will be a wire mesh having a filament diameter in the range from about 0.001 inch to about 0.005 inch, composed of a weather and temperature resistant metal, such as Nichrome ®. The mesh density will typically be in the range from about 50 to 200 filaments per inch, usually being about 100 to 150 filaments per inch. Usually, at least two grid structures 30 will be provided in each tension frame 32, more usually at least four grid structures will be provided, and often eight or more grid structures will be provided. It will also be possible to provide multiple tension frames 32, although the total number grid structures 30 will usually not exceed eight.

For the purpose of illustrating the interwoven nature of the grid structure 30, FIG. 2 exaggerates the gaps shown at the intersections of the horizontal and vertical wire screen strip edges. Such gaps do not exist in the actual weave which is tight.

The airstream will be drawn through the interstices between individual filaments of the multiple screen strips 33 and will pass into the downcomer region 16 as illustrated in FIG. 1. Such flow will, of course, be induced by suction from the individual riser fans 24 and, to a certain extent, by the air return fan 22.

Warm air returning to the air permeable heating surface 12 flows upward through riser 14 into a plenum 36 formed by a duct 38 which circumscribes the frame 32 of the heating surface 12. A plurality of apertures or nozzles 40 are formed on the interior surface of the duct 38 and oriented to direct the warm return air inwardly, as generally indicated by streamlines 42 in FIGS. 2 and 3. While only six streamlines 42 are illustrated in FIG. 2, it will be appreciated that a much greater number of nozzles 40 will normally be provided in order to create a substantially continuous sheet-like inwardly directed flow of the warm return air over the air permeable heating surface 12.

By directing the flow of warm return air in an inwardly converging pattern, as illustrated, a desired air flow profile through the air permeable heating surface is promoted As the air converges, it is drawn inward through the permeable surface 12 as indicated by arrows 44 in FIG. 3. Desirably, the air mass flow rate at any location through the air permeable heating surface 12 should be proportional to the amount of incident radiation at that location in order to maximize heat extraction from the surface. For example, when the solar radiation is focused at the center of the heating surface 12, it is desirable to increase the mass flow rate through the center relative to that through the periphery.

The desired flow profile may be promoted by varying the permeability or porosity of the air permeable heating surface 12 as a function of location. For a substantially flat, rectangular heating surface 12 when the radiation is focused at the center, it will generally be desirable to increase the permeability or porosity in the regions closer to the center while relatively decreasing the permeability at the periphery. As the flow converges to the center, the mass flow rate through the center of the air permeable heating surface 12 will tend to be greater, thus efficiently utilizing the greater amount of heat resulting from the focused radiation. Also, it will be possible to vary the angle at which the warm air is discharged over the air permeable heating surface 12 in order to provide the desired flow profile through the surface. In addition, the flow area reduction contour in region 46 of downcomer duct 16 which lies immediately behind the air permeable heating surface 12 may be altered in a manner which tends to promote the desired flow distribution across the surface 12 in order to match the radiant energy profile.

As described so far, the central solar receiving tower 10 includes all components necessary for recycling a warm airstream, introducing energy to the stream at a first location on the recirculating flow path, and extracting energy from the recirculating stream at a second point on the flow path. The solar receiving elements of the system comprising the air permeable heating surfaces 12 are particularly efficient in that they are directly exposed to the ambient and not recessed within protective enclosure. Moreover, an efficient method for introducing the warm return air to the heating surfaces 12 has been described. The nature of the system, however, is such that the warm return air being introduced on the exterior of the heating surfaces 12 is generally exposed to disturbances from the ambient, particularly the spilling of warm air and the mixing of cold air resulting from wind disturbances.

In order to inhibit such heat losses from the central solar receiving tower 10, a system for protecting or buffering the heated air from the ambient is provided. The system comprises a protective air duct 50 formed adjacent to the warm air return duct 38. The duct 50 includes a plurality of nozzles or apertures 52 which are oriented to direct a protective airstream or curtain in a flow pattern substantially similar to that of the warm air flowing inward through duct 38. As illustrated, the protective air will be introduced in the same flow pattern as illustrated in FIG. 2, i.e., so that it will be directed to converge at a point generally near the center of the air permeable heating surface 12.

As best observed in FIG. 3, the simultaneous introduction of the warm return air and cold protective air through the respective ducts 38 and 50 results in a boundary layer 60 being formed therebetween. The warm air, which flows to the inside of the boundary layer 60, is still able to flow inward through the air permeable surface along flow lines 44 as previously described. The cold air, which is on the outside of the boundary layer 60, will flow outwardly along flow lines 62 forming a second boundary layer 64 with the ambient air. The outwardly flowing protective air thus forms a buffer layer which reduces or eliminates disturbances in the warm return air flow resulting from mixing and/or spillage with the ambient air.

Referring now to FIGS. 4–7, specific examples of the structure for delivering the warm return air and cold protective air to the air permeable heating surface 12 will be described. In FIG. 4, a warm air plenum 70 and cold air plenum 72 are located adjacent to one another about the periphery of the heating surface 12. The plenums 70 and 72 include nozzle structures 74 and 76, respectively, which project a plurality of discrete airstreams (or a continuous or semi-continuous curtain of air) at an angle $\alpha$ relative to the exposed face of air permeable heating surface 12. The angle $\alpha$ will typically vary in the range from about 5 to 45 degrees, preferably being in the range from about 15 to 30 degrees, with the specific angle chosen to enhance the uniformity of flow of returned warm air through the heating surface 12 while still providing the desired outward protective flow of air from ambient air plenum 72.

The solar receiving structure of FIG. 4 further includes a reflective skirt 78 which circumscribes the periphery of the air permeable heating surface 12. Skirt 78 includes an inner reflective surface which reflects solar radiation back onto the exposed face of the heating surface 12 to promote improved collection efficiency. Conveniently, the rear side 79 of skirt 78 is cooled by the ambient air blown into air plenum 72 by fans (not shown).

Referring now to FIG. 5, a solar receiving structure 90 similar to that of FIG. 4 is illustrated. The primary difference is that the protective air plenum 72' is spaced forwardly apart from the warm air return plenum 70. As illustrated, the protective air plenum 72' is disposed about the forward periphery of the reflective skirt 78. The second difference is that warm air returning to the surface 12 may be discharged through nozzles 74 of plenum 70 at a first angle $\alpha$, while the protective air from plenum 72' may be discharged through nozzles 76' at a second angle $\beta$. The structure of FIG. 5 is advantageous in that the warm and cool airstreams from plenums 70 and 72', respectively, become separated by a system of secondary flow convection cells which are at an intermediate temperature, resulting in a more gradual temperature gradient between the warm and cool air. The attenuation of the temperature profile, in turn results in a more gradual density gradient which promotes flow stability and tends to reduce mixing of the two airstreams.

Referring now to FIG. 6, a solar receiving structure 100 is illustrated which is substantially the same as that of FIG. 5, except the protective air plenum 72" is oriented so that nozzles 76" are oriented to project airstreams which are substantially parallel to the forward face of air permeable heating surface 12. Such a structure is advantageous in that the radial velocity component of the airstream emanating from nozzles 76" is maximized which, in turn, enhances the effect of the stream over the entire heating surface area. Under certain circumstances, this might provide a more effective shield against ambient winds. The dominance of the protective airstream may be further enhanced by orienting nozzles 76" to provide a tangential velocity component. The resulting vortical flow may increase the buffering effect.

Referring now to FIG. 7, an additional embodiment 110 of the solar receiving structure of the present invention is illustrated. In structure 110, both the warm air return plenum 70''' and the protective air plenum 72''' are mounted at the forward periphery of reflective skirt 78. The nozzles 76''' of the protective air plenum 72''' are oriented at an angle $\beta$, while the nozzles 74''' of the warm air return plenum 70''' are oriented to direct the warm air flow in a plane which is substantially parallel to the forward face of the air permeable heating surface 12. The structure 110 is advantageous in that separation of the warm airstream from the heating surface allows greater control over the distribution of the warm air flowing back through the heating surface.

Referring now to FIG. 8 solar receiving structure 130 having a cylindrical air permeable heating surface 132 is illustrated. A circular warm air return plenum 134 and a circular protective air plenum 136 are provided at the upper and lower peripheries of the cylindrical heating surface 132. In the particular embodiment illustrated, the plenums 134 and 136 are located immediately adjacent to the outer periphery of the cylindrical air permeable heating surface 132 and include nozzles 135 and 137 directing the air flow at a small angle away from the surface, generally as illustrated in FIG. 4 hereinbefore. The structure 130 might further include a reflective skirt (not illustrated) responding generally to the reflective skirt 78 in FIG. 4, and the plenums 134 and 136 might be moved relative to each other and to the reflective skirt in any of the geometries illustrated in FIGS. 5–7. A warm air riser 140 (typical of one to twenty of such risers) may be provided internally within the structure 130, while conduits 142 supply ambient air from a fan 144 to the protective air plenums 136. The advantage of the solar receiving structure 130 is that solar radiation may be reflected from any direction in the heliostat field and can be made to strike the heating surface 132 at a substantially perpendicular angle. In this way, heating efficiency can be maximized.

Although the foregoing invention has been described in detail for purposes of clarity of understanding, it will be obvious that certain modifications may be practiced within the scope of the appended claims.

What is claimed is:

1. A system for introducing an airstream to be heated to an air permeable heating surface, said system comprising:
   means for flowing the airstream in a converging pattern adjacent to the surface; and
   means for flowing a protective airstream adjacent to the airstream to be heated in a converging pattern similar to that of the airstream to be heated, said protective airstream being located on a side of the airstream to be heated opposite to that of the heating surface, whereby the airstream to be heated flows inwardly through the surface while the protective airstream flows outwardly away from the surface.

2. A system as in claim 1, wherein the flow patterns converge substantially radially.

3. A system as in claim 1, wherein the flow patterns converge substantially along a linear or curvilinear front.

4. A system as in claim 1, wherein the air permeable heating surface is a series of grid structures, each grid structure being formed of interwoven wire screen strips.

5. A system as in claim 4, wherein the series of grid structures is formed into a substantially planar geometry.

6. A system as in claim 4, wherein the series of grid structures is formed into a substantially cylindrical geometry.

7. A system for producing a heated airstream from focused solar radiation, said system comprising:
   means for recirculating an airstream to be heated along a path;
   a heating surface located on the path, said surface being disposed to receive said focused solar radiation and being permeable to the flow of air therethrough;
   means for flowing at least a portion of the recirculating airstream in a converging pattern adjacent to the heating surface; and
   means for flowing a protective airstream adjacent to the recirculating airstream in a converging pattern similar to that of the recirculating airstream, said protective airstream being located on a side of the recirculating airstream opposite to that of the heating surface, whereby the recirculating airstream flows through the heating surface while the protective airstream flows away from the heating surface.

8. A system as in claim 7, further comprising means for extracting energy from the recirculating airstream located along the path.

9. A system as in claim 8, wherein the means for recirculating includes duct work for transporting heated air from the heating surface to the extracting means and a fan for returning the air to the means for flowing the recirculating airstream in a converging pattern.

10. A system as in claim 7, wherein the means for flowing the recirculating airstream in a converging pattern includes a plenum formed about the periphery of the heating surface, whereby the airstream is directed in a substantially radially converging pattern.

11. A system as in claim 7, wherein the means for flowing the recirculating airstream in a converging pattern includes a pair of opposed plenums, whereby the airstream is directed to converge along a substantially linear or curvilinear front.

12. A method for heating a recirculating airstream, said method comprising:
   converging the recirculating airstream in a preselected pattern at a location proximate a solar heating surface; and
   converging a protective airstream adjacent to the recirculating airstream in a pattern similar to that of the recirculating airstream, said protective airstream converging on a side of the recirculating airstream opposite to that of the solar heating surface, whereby the recirculating airstream flows toward the solar heating surface while the protective airstream flows away from the solar heating surface.

13. A method as in claim 12, wherein the preselected pattern is radial convergence to a point.

14. A method as in claim 13, wherein the protective airstream converges in a vortical flow pattern.

15. A method as in claim 12, wherein the preselected pattern is convergence along a linear or curvilinear front.

16. A method as in claim 12, wherein the protective airstream is ambient air.

17. A method as in claim 12, wherein the ratio of the flow velocity of the protective airstream to the recirculating airstream is in the range from about 1:1 to 10:1.

18. A method for recirculating an airstream through a solar receiving tower having at least two heating surfaces, wherein each surface receives warm air from a separate riser and delivers heated air to a separate downcomer, said heated air being supplied to heat extracting means, said method comprising:
   controlling the temperature of air exiting each heating surface by modulating the air mass flow through each corresponding downcomer; and
   balancing the air mass flow to each heating surface with that from the heating surface by modulating the air mass flow from the riser separately from modulation of the air mass flow through the downcomer, whereby air loss to the ambient and air intrusion from the ambient are minimized.

19. A method as in claim 18, further comprising modulating the mass air flow through each of the risers in order to inhibit flow variations resulting from static pressure variations at each of the heating surfaces.

20. An air permeable heating surface comprising a series of at least two grid structures disposed adjacent one another on a frame, wherein each grid structure comprises a plurality of interwoven wire screen strips tensioned on said frame.

21. An air permeable heating surface as in claim 20, wherein the interwoven screen strips are arranged in horizontal and vertical courses.

22. An air permeable heating surface as in claim 20, having an increased air permeability near the center compared to that near the periphery.

* * * * *